United States Patent
Bengtsson et al.

(10) Patent No.: US 11,405,877 B2
(45) Date of Patent: Aug. 2, 2022

(54) DOWNLINK SYNCHRONIZATION SIGNALS

(71) Applicant: SONY GROUP CORPORATION, Tokyo (JP)

(72) Inventors: Erik Bengtsson, Eslöv (SE); Ove Edfors, Lund (SE); Fredrik Tufvesson, Lund (SE); Basuki Priyanto, Lund (SE); Olof Zander, Södra Sanby (SE)

(73) Assignee: SONY GROUP CORPORATION, Tokyo (JP)

(*) Notice: Subject to any disclaimer, the term of this patent is extended or adjusted under 35 U.S.C. 154(b) by 44 days.

(21) Appl. No.: 16/329,891

(22) PCT Filed: Sep. 2, 2016

(86) PCT No.: PCT/EP2016/070725
§ 371 (c)(1),
(2) Date: Mar. 1, 2019

(87) PCT Pub. No.: WO2018/041362
PCT Pub. Date: Mar. 8, 2018

(65) Prior Publication Data
US 2019/0253989 A1    Aug. 15, 2019

(51) Int. Cl.
*H04W 56/00* (2009.01)
(52) U.S. Cl.
CPC ................... *H04W 56/001* (2013.01)
(58) Field of Classification Search
CPC .................................. H04W 56/001
USPC ........................................... 370/350
See application file for complete search history.

(56) References Cited

U.S. PATENT DOCUMENTS

| | | | | |
|---|---|---|---|---|
| 7,206,554 | B1* | 4/2007 | Lindskog | H04B 7/0617 370/329 |
| 9,185,669 | B2* | 11/2015 | Lee | H04W 56/0015 |
| 2007/0053282 | A1* | 3/2007 | Tong | H04L 25/0244 370/208 |
| 2011/0263245 | A1* | 10/2011 | Ishii | H04W 56/0015 455/423 |
| 2013/0077658 | A1* | 3/2013 | Hui | H04B 7/0413 375/219 |
| 2013/0230008 | A1* | 9/2013 | Christoffersson | H04W 52/146 370/329 |
| 2017/0055187 | A1* | 2/2017 | Kang | H04W 36/0069 |
| 2017/0195019 | A1* | 7/2017 | Shang | H04B 7/0456 |

FOREIGN PATENT DOCUMENTS

| | | |
|---|---|---|
| CN | 103959700 A | 7/2014 |
| CN | 104113387 A | 10/2014 |

OTHER PUBLICATIONS

Interdigital Communications: "On Beam-based initial Access for NR" 3GPP Draft; R1-167574, vol. RAN WG1, No. Gothenburg, Sweden; Aug. 22, 2016-Aug. 26, 2016 Aug. 21, 2016 (Aug, 21, 2016), XP051125980.

(Continued)

*Primary Examiner* — Pankaj Kumar
*Assistant Examiner* — Kokou R Detse
(74) *Attorney, Agent, or Firm* — Myers Bigel, P.A.

(57) ABSTRACT

A sequence of downlink synchronization signals is transmitted to a device using a plurality of propagation channels. The plurality of propagation channels is selected according to an at least partly random pattern.

16 Claims, 17 Drawing Sheets

(56) References Cited

OTHER PUBLICATIONS

PCT International Search Report dated Jul. 13, 2017 for corresponding International Application No. PCT/EP2016/070725 (7 pages).
PCT Written Opinion of the International Searching Authority dated Jul. 13, 2017 for corresponding International Application No. PCT/EP2016/070725 (9 pages).

* cited by examiner

DOWNLINK SYNCHRONIZATION SIGNALS

CROSS REFERENCE TO RELATED APPLICATIONS

This application is a 35 U.S.C. § 371 national stage application of PCT International Application No. PCT/EP2016/070725, filed on Sep. 2, 2016, the contents of which are incorporated herein by reference in its entirety. The above-referenced PCT International Application was published in the English language as International Publication No. WO 2018/041362 A1 on Mar. 8, 2018.

TECHNICAL FIELD

Various embodiments relate to techniques of communicating downlink synchronization signals on a wireless link. Various embodiments specifically relate to communicating a sequence of downlink synchronization signals using a plurality of propagation channels.

BACKGROUND

For communication on wireless links it is often desired to provide a common time reference and/or common frequency reference to the participating stations and devices. In other words, it can be desirable to synchronize stations and devices transmitting and/or receiving (communicating) on the wireless link. For example, in the Third Generation Partnership Project (3GPP) Technical Specification (TS) 36.211 V13.2.0 (2016-06) chapter 6.11.1 and 6.11.2, primary synchronization signals (PSS) and secondary synchronization signals (SSS) are known. For example, a terminal may acquire symbol timing of downlink (DL) symbols transmitted by a base station based on the received primary synchronization signals. For example, the terminal may acquire the timing and/or frequency of transmission frames of the wireless link based on the received secondary synchronization signals. Furthermore, it may be possible to derive information on the identity of the transmitting base station, respectively the associated cell, from the synchronization signals.

Based on a common time reference and/or a common frequency reference, communication on the wireless link can be synchronized. For example, communication of pilot signals and data symbols on the wireless link can be synchronized. By synchronizing the communication, a time-frequency resource mapping (sometimes also referred to as time-frequency resource grid) can be defined and resources can be allocated to certain stations and devices. Thereby, interference can be mitigated.

However, reference implementations of synchronizing stations and devices communicating on a wireless link face certain restrictions and drawbacks. For example, reference implementations of synchronizing stations and devices communicating on a wireless link may require significant receive power levels of the associated synchronization signals in order to ensure an accurate synchronization. For example, reference implementations of synchronizing stations and devices communicating on a wireless link may require complex logic implemented at stations and devices to be synchronized.

SUMMARY

Therefore, a need exists of advanced techniques of synchronizing stations and devices communicating on a wireless link. In particular, a need exists for techniques of synchronizing stations and devices communicating on a wireless link which overcome or mitigate at least some of the above-identified restrictions and drawbacks.

This need is met by the features of the independent claims. The features of the dependent claims define embodiments.

According to an example, a base station includes an antenna array having a plurality of antennas. The base station further includes an interface. The interface is coupled with the antenna array. The interface is configured to communicate on a wireless link. The base station further includes at least one processor configured to control the interface to transmit a sequence of DL synchronization signals to a device using a plurality of propagation channels. The plurality of propagation channels may be selected according to an at least partly random pattern.

According to an example, a method includes transmitting a sequence of DL synchronization signals to a device using a plurality of propagation channels. The plurality of propagation channels may be selected according to an at least partly random pattern.

According to an example, a computer program product includes program code. The program code may be executed by at least one processor. Execution of the program code causes the at least one processor to perform a method. The method includes transmitting a sequence of DL synchronization signals to a device using a plurality of propagation channels. The plurality of propagation channels may be selected according to an at least partly random pattern.

According to an example, a computer program includes program code. The program code may be executed by at least one processor. Execution of the program code causes the at least one processor to perform a method. The method includes transmitting a sequence of DL synchronization signals to a device using a plurality of propagation channels. The plurality of propagation channels may be selected according to an at least partly random pattern.

According to an example, a device includes at least one antenna. The device further includes an interface. The interface is coupled with the at least one antenna. The interface is configured to communicate on a wireless link. The device further includes at least one processor configured to control the interface to receive a sequence of DL synchronization signals from a base station using a plurality of propagation channels. The at least one processor is further configured to acquire a timing and/or frequency of the base station based on the DL synchronization signals. The plurality of propagation channels may be selected according to an at least partly random pattern.

According to an example, a method includes receiving a sequence of DL synchronization signals from a base station using a plurality of propagation channels. The method further includes acquiring a timing and/or frequency of the base station based on the DL synchronization signals. The plurality of propagation channels may be selected according to an at least partly random pattern.

According to an example, a computer program product includes program code. The program code may be executed by at least one processor. Execution of the program code causes the at least one processor to perform a method. The method includes receiving a sequence of DL synchronization signals from a base station using a plurality of propagation channels. The method further includes acquiring a timing and/or frequency of the base station based on the DL synchronization signals. The plurality of propagation channels may be selected according to an at least partly random pattern.

According to an example, a computer program includes program code. The program code may be executed by at least one processor. Execution of the program code causes the at least one processor to perform a method. The method includes receiving a sequence of DL synchronization signals from a base station using a plurality of propagation channels. The method further includes acquiring a timing and/or frequency of the base station based on the DL synchronization signals.

The plurality of propagation channels may be selected according to an at least partly random pattern.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
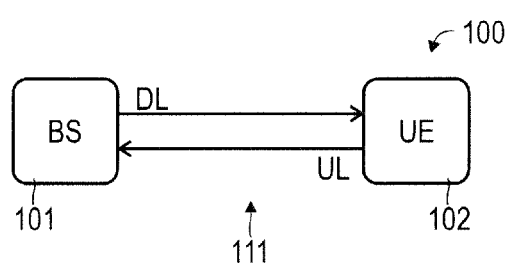
FIG. 1 schematically illustrates a network comprising a base station, a terminal, and a wireless link for communicating between the base station and the terminal according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein enable synchronization between base stations and devices communicating on a wireless link. Various techniques described herein enable to provide a common time reference and/or a common frequency reference to stations and devices communicating on the wireless link. Based on such a common time reference and/or frequency reference, it is possible to implement a time-frequency resource mapping to synchronize communication of UL signals and/or of DL signals between stations and devices communicating on the wireless link.

According to various examples, a sequence of DL synchronization signals is communicated on the wireless link. The sequence may implement multiple repetitions of the DL synchronization signals. The sequence may have a well-defined duration. The sequence may use adjacent transmission frames of the wireless link for transmission of the DL synchronization signals. The sequence, in some examples, may use adjacent resources for transmission of DL synchronization signals. As such, it may be possible to average the received DL synchronization signals of the sequence to thereby increase the signal-to-noise ratio at the receiver. This facilitates coverage enhancement.

According to various examples, the sequence of DL synchronization signals is communicated on the wireless link using a plurality of propagation channels. Propagation channels may describe the spatial path of the electromagnetic waves carrying the DL synchronization signals between the transmitter and the receiver. For example, the propagation channels may be described in terms of transmission beams having a certain beam width. Sometimes, propagation channels are also referred to as spatial streams. By means of the plurality of spatial streams, it is possible to provide diversity. Fading can be counteracted. This typically increases a reliability and/or accuracy of the synchronization.

The techniques described herein can be employed in various applications scenarios. In various scenarios, the stations and devices may be implemented, e.g., by base stations and/or terminals of a cellular network. For example, a 2G, 3G, 4G or upcoming 5G network could be used. For example, in the framework of 3GPP 4G the base station may be implemented by an evolved Node B. For example in a 3GPP 5G framework, the base station may be implemented as a 5G gNB.

For example, the techniques described herein may be employed in multiple input-multiple output (MIMO) scenarios. For example, the techniques described herein may be employed in massive MIMO (MaMi) scenarios. In MaMi, a base station (BS) includes one or more antenna arrays having a plurality of antennas. By combining the signals from all antennas additional gain and/or spatial resolution can be obtained. For example, the techniques described herein may facilitate synchronization of Internet of Things (IOT) devices. For example, this may correspond to the 3GPP Enhanced Machine-type Communication (eMTC) or the 3GPP Narrowband Internet of Things (NB-IoT) technology: These examples are described in 3GPP RP-161321 "New work item proposal on further enhanced MTC", Ericsson, RAN #72, and RP-161324 "New work item proposal: enhancements of NB-IOT", Vodafone, Huawei, HiSilicon, Ericsson, Qualcomm, RAN #72, respectively. Such devices are typically characterized by low cost implementations resulting in restrictions on the output power, low data rate, limited payloads, relaxed latency requirements and a restricted frequency band accessible for communication. Similar techniques may be applied with respect to 3GPP New Radio (NR), see 3GPP RP-160671.

For MaMi technology, the channel is typically sounded using pilot signals. Typically, UL pilot signals are transmitted from the terminal to the BS. Under the assumption of reciprocity of the channel, the UL pilot signals are used to determine encoding of DL data (link adaptation). Such an approach is facilitated by time-division duplexing (TDD) approaches where UL and DL data is alternatingly communicated. For synchronization, transmission and reception are not yet synchronized.

FIG. 1 schematically illustrates a wireless communication network 100 which may benefit from the techniques disclosed herein. E.g., the network 100 may be a 3GPP-specified network such as 3G, 4G and upcoming 5G New Radio (NR). Other examples include point-to-point networks such as Institute of Electrical and Electronics Engineers (IEEE)—specified networks, e.g., the 802.11x Wi-Fi protocol or the Bluetooth protocol. Further examples include a 3GPP NB-IoT, eMTC or NR network 100.

The network 100 includes a BS 101 and a terminal 102 (labeled user equipment, UE in the FIGS.). A wireless link 111 is established between the BS 101 and the terminal 102. The link 111 includes a DL link from the BS 101 to the terminal 102; and further includes an UL link from the terminal 102 to the BS 101. TDD and/or frequency-division duplexing (FDD) may be employed for the DL channel and the UL channel.

The terminal 102 may be one of the following: a smartphone; a cellular phone; a table; a notebook; a computer; a smart TV; a MTC device; an eMTC device; an IoT device; an NB-IoT device; a sensor; an actuator; etc. Sometimes the terminal is also referred to as UE.

Figure 2:
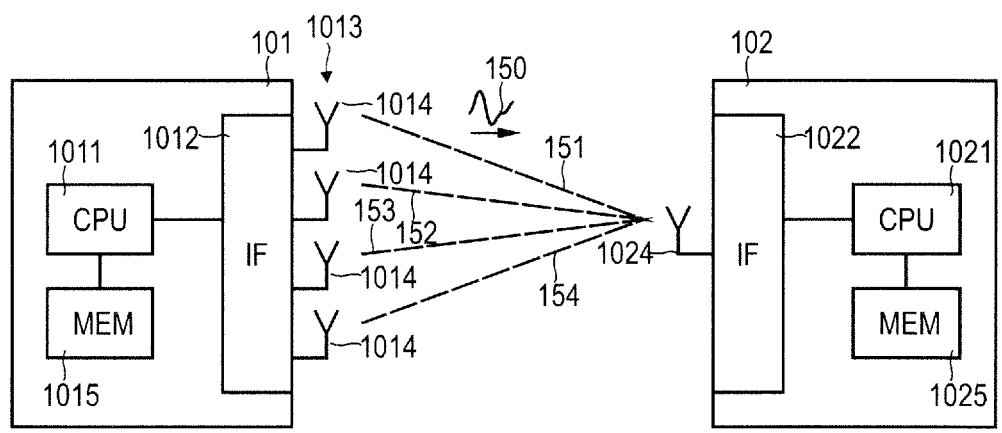
FIG. 2 schematically illustrates the network of FIG. 1 in greater detail and further illustrates various propagation channels between the base station and the terminal according to various embodiments.

FIG. 2 schematically illustrates the BS 101 and the terminal 102 in greater detail. The BS 101 includes a processor 1011 and an interface 1012. The interface 1012 is coupled with an antenna array 1013 including a plurality of antennas 1014, e.g., at least 30 antennas 1014, optionally at least 100 antennas, further optionally at least 200 antennas. Each antenna 1014 may include one or more electrical traces to carry a radio frequency current. Each antenna 1014 may include one or more LC-oscillators implemented by the electrical traces. Each trace may radiate electromagnetic waves with a certain beam pattern. As such, the antennas 1014 may form an antenna port for providing an output signal to the radiating LC-oscillators. The BS 101 further includes a memory 1015, e.g., a non-volatile memory. The memory may store control instructions that can be executed by the processor 1011. Executing the control instructions causes the processor 1011 to perform techniques with respect to synchronization as described herein.

The terminal 102 includes a processor 1021 and an interface 1022. The interface 1022 is coupled with an antenna 1024. The antenna 1024 may include one or more electrical traces to carry a radio frequency current. The antenna 1024 may include one or more LC-oscillators implemented by the electrical traces. Each traces may radiate electromagnetic waves with a certain beam pattern. As such, the antenna 1024 may form an antenna port for providing an output signal to the radiating LC-oscillators. While in the example of FIG. 2 the terminal 102 includes a single antenna 1012, in other examples, the terminal 102 may include an antenna array (not shown in FIG. 2) including a plurality of antennas. The terminal 102 further includes a memory 1025, e.g., a non-volatile memory. The memory 1025 may store control instructions that can be executed by the processor 1021. Executing the control instructions causes the processor 1021 to perform techniques with respect to synchronization as described herein.

FIG. 2 schematically illustrates that different propagation channels 151-154 are implemented on the link 111. The different propagation channels 151-154 are associated with different antenna weights of the antennas 1013 of the antenna array 1014 of the BS 101 (steering vectors): hence, different propagation channels 151-154 may be obtained by using different amplitude and phase configurations for the various antennas 1014 of the antenna array 1013. Different ones of the propagation channels 151-154 may have different transmission characteristics such as number of reflections, path loss, and generally transmission reliability and/or capacity. In particular, different propagation channels 151-154 can have different fading profiles at the position of the terminal 102. Fading typically occurs due to destructive interference of reflected electromagnetic waves carrying the signals at the position of the terminal 102. By using different propagation channels 151-154, diversity can be provided to reduce fading.

As illustrated in FIG. 2, the BS 101 transmits DL synchronization signals 150. The DL synchronization signals 150 facilitate acquisition of the timing and/or frequency of the BS 101 by the terminal 102. For example, the terminal 102 can be configured to acquire the timing and/or frequency of the BS 101 based on the DL synchronization signals 150.

The communication of the DL synchronization signals 150 is protected against fading: For example, the BS 101 can be configured to transmit the sequence of the DL synchronization signals 150 using different propagation channels 151-154. Hence, it is possible that the processor 1011 is configured to control the interface 1012 to implement the different propagation channels 151-154 by using different antenna weights for the antennas 1014 of the antenna array 1013. Each propagation channel 151-154 may be associated with a different steering vector. For example, different antenna weights associated with different propagation channels 151-154 can be activated by the interface 1012 to toggle through the different propagation channels 151-154.

Such techniques facilitate reduction of fading, and thus an efficient implementation of the synchronization. This improves acquisition reliability of the timing and/or frequency of the BS 101 by the terminal 102. If the timing and/or frequency of the BS 101 is acquired by the terminal 102, communication of data can commence.

Figure 3:
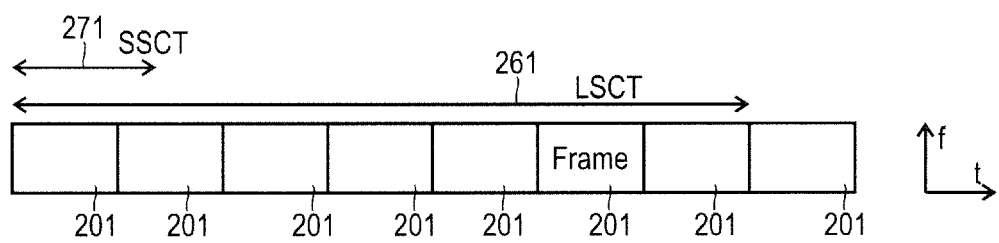
FIG. 3 schematically illustrates transmission frames of the wireless link according to various embodiments and further illustrates small-scale fading and large-scale fading according to various embodiments.

FIG. 3 illustrates a time sequence of transmission frames 201 used for communication on the link 111. The transmission frames 201 may be one or more of the following: frames; sub-frames; and timeslots. Depending on the particular implementation of the transmission frames 201, the duration of each transmission frame 201 may greatly vary. E.g., in some scenarios an individual transmission frame 201 may be of the duration of 200 or 500 milliseconds. In other examples, an individual transmission frame 201 may be of the duration of 1 second, 5 seconds, etc.

FIG. 3 illustrates a typical timescale 271 of small-scale fading; this is called the small-scale coherence time (SSCT). It is apparent that in the non-limiting example of FIG. 3, the SSCT 271 is of the same order of magnitude as the duration of a transmission frame 201.

FIG. 3 further illustrates a typical timescale 261 of large-scale fading, referred to as large-scale coherence time (LSCT). The LSCT 261 fading is significantly longer than the SSCT. In realistic MaMi scenarios, the ratio between the LSCT 261 and the SSCT 271 may be at least 200, or at least 500, or at least 1000. Similar ratios typically apply for the large-scale coherence bandwidth (LSCB) with respect to the short-scale coherence bandwidth (SSCB).

The techniques described herein facilitate synchronization despite presence of small-scale fading and large-scale fading. This is achieved by implementing a sequence of DL synchronization signals: if the duration of the sequence of the DL synchronization signals is in the order of the SSCT 271 and/or the LSCT 261, it becomes possible to reduce the impact of small-scale fading and/or large-scale fading by multiple repetitions of the DL synchronization signals. This is further achieved by using a plurality of propagation channels 151-154: typically, the fading characteristics vary from propagation channel to propagation channel such that the impact of small-scale fading and/or large-scale fading can be reduced by the multiple repetitions of the DL synchronization signals using the plurality of propagation channels.

Figure 4:
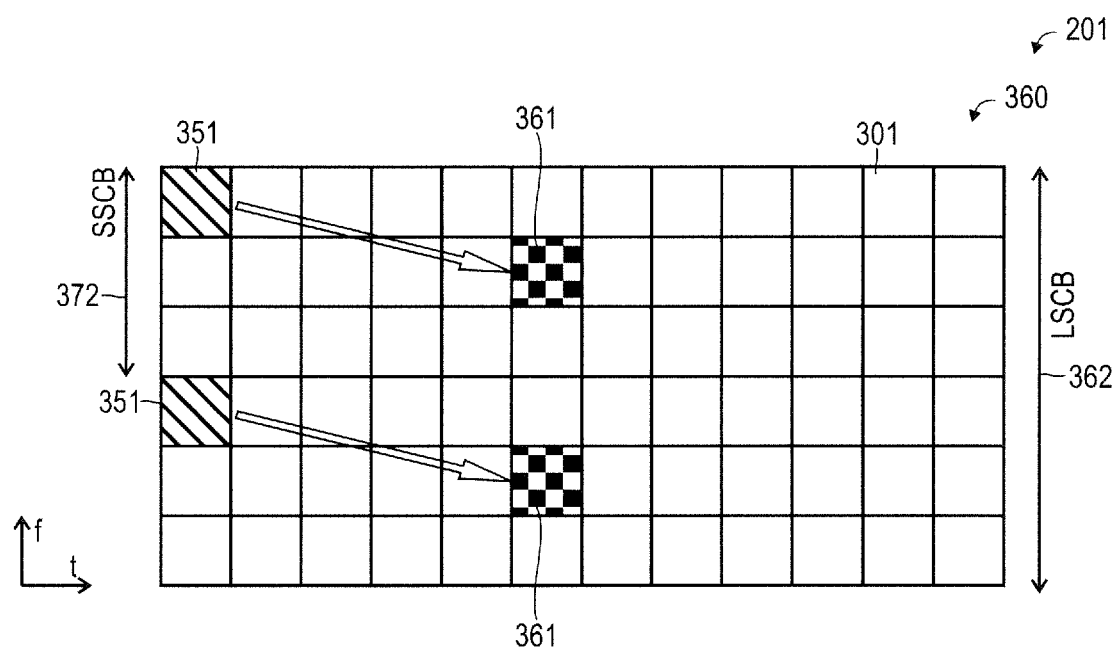
FIG. 4 schematically illustrates a resource mapping of a transmission frame of the wireless link according to various embodiments and further illustrates a massive MIMO protocol according to various embodiments.

FIG. 4 illustrates aspects with respect to a transmission frame 201. The transmission frame 201 includes resources 301 arranged according to a certain resource mapping 360. The resources 301 are distributed in time domain (horizontal axis in FIG. 4) and frequency domain (vertical axis in FIG. 4). In the example of FIG. 4, the resources 301 have an Orthogonal Frequency Division Multiplex (OFDM)-type structure: multiple sub-bands (6 in the example of FIG. 4) are treated individually. Symbols are defined by each column of the resource mapping 360.

FIG. 4 illustrates aspects with respect to the MaMi protocol for transmission of DL data symbols 381. Similar techniques may alternatively or additionally applied for transmission of UL data symbols (not illustrated in FIG. 4) The MaMi protocol may be implemented by the BS 101 and/or the terminal 130. In particular, FIG. 4 illustrates aspects with respect to relying on reciprocity of the link 111 for encoding DL data symbols 381: In the example of FIG. 4, UL pilot signals 351 are transmitted by the terminal 102 and received by the BS 101 (in FIG. 4, the UL pilot signals 351 are illustrated by the dashed filling). In response to transmitting the UL pilot signal 351, the terminal 102 receives DL symbols 361 from the BS 101 (checkerboard filling in FIG. 4). The DL data symbols 361 encode DL data. The DL data may correspond to application-layer user data and/or control data. The DL symbols 361 may encode the DL data according to the adjacent UL pilot signals 351 (arrows in FIG. 4): the time-frequency density of the UL pilot signals 351 is sufficiently high to address the SSCB 272 and SSCT 362. In particular, the BS 101 may encode the DL data based on a receive property of the respective UL pilot signal 371. Thereby, fading is reduced. This is sometimes referred to as channel hardening.

For example, according to the MaMi protocol, spatial diversity can be employed to multiplex transmission between the BS 101 and multiple terminals. For example, multiple signals to each terminal may travel along different propagation paths and only the intended signals may add coherently.

In order to ensure alignment of the UL pilot signals 351 with the resource grid defined by the resource mapping 360, synchronization of the terminal 102 and the BS 101 with a common time reference and/or a common frequency reference is desired. For this, the DL synchronization signals 150 (not shown in FIG. 4) can be transmitted by the BS 101.

Figure 5:
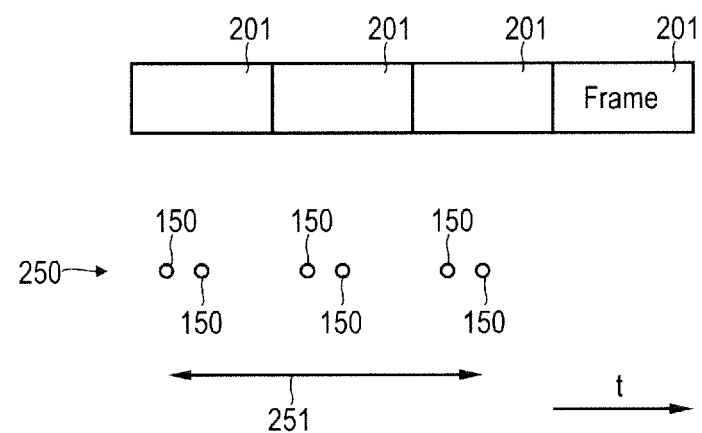
FIG. 5 schematically illustrates a sequence of DL synchronization signals according to various embodiments.

FIG. 5 illustrates aspects with respect to the communication of the DL synchronization signals 150. In particular, FIG. 5 illustrates aspects with respect to a sequence 250 of the DL synchronization signals 150. In the example of FIG. 5, multiple repetitions of the DL synchronization signals 150 are communicated in the sequence 250. In some examples, the time interval between repetitive transmissions of the DL synchronization signals 150 may be predefined. In some examples, the repetitive transmission of the DL synchronization signals 150 may be allocated to adjacent resources 301, i.e., adjacent symbols. The sequence 250 may comprise in some examples more than 20 DL synchronization signals 150, optionally more than 100 DL synchronization signals, further optionally more than 300 DL synchronization signals. The sequence 250 may be intermitted—i.e., with intermediate resources 301 not allocated to DL synchronization signals 150—or may be contiguous—i.e., with no intermediate resources 301 not allocated to DL synchronization signals 150.

For example, the multiple repetitions of the DL synchronization signals 150 may facilitate averaging of the received DL synchronization signals 150 by the terminal 102. For example, averaging may correspond to summation of the power or magnitude of the received DL synchronization signals 150. For example, averaging may be different from a coherent combination to avoid suppression of the signal due to destructive interference.

As such, it is possible that the DL synchronization signals 150 of the sequence 250 correspond to each other. For example, it is possible that the DL synchronization signals 150 of the sequence 250 are all alike. For example, it is possible that the DL synchronization signals 150 of the sequence 250 are all encoded based on the same sequence code. For example, it is possible that the DL synchronization signals 150 of the sequence 250 are all encoded based on the sequence code is defined by 3GPP TS 36.211 V13.2.0 (2016-06) chapter 6.11.1 or chapter 6.11.2 for the PSS and SSS. For example, if the sequence code for encoding the DL synchronization signals 150 of the sequence 250 depends on the particular transmission frame 201, it would be possible to take into account such a dependency—or another predefined dependency—when averaging multiple received DL synchronization signals 150 at the terminal 102.

In the example of FIG. 5, the sequence 250 includes multiple DL synchronization signals 150 in each one of a plurality of adjacent transmission frames 201. This facilitates reduction of fading, because typically the duration 251 of the sequence 250 is longer than the SSCT 271. It is also possible that the duration 251 of the sequence 250 longer than the LSCT 261.

Figure 6:
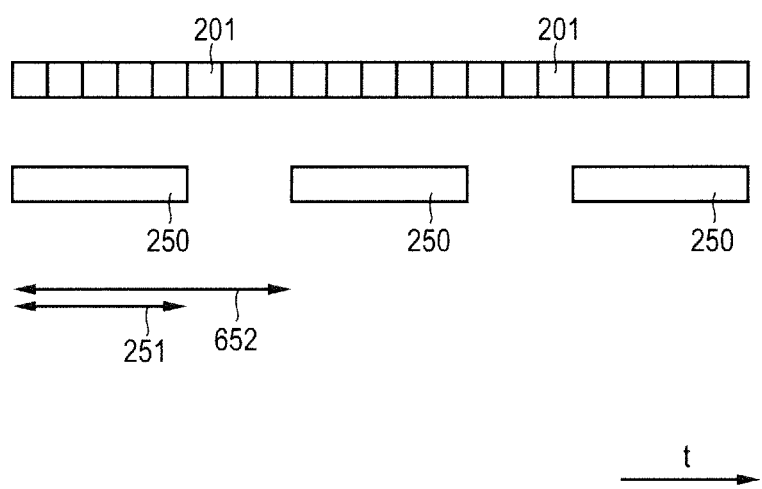
FIG. 6 schematically illustrates a plurality of sequences of DL synchronization signals according to various embodiments.

FIG. 6 illustrates aspects with respect to the communication of the DL synchronization signals 150. In particular, FIG. 6 illustrates aspects with respect to communication of a plurality of sequences 250, each sequence including a plurality of DL synchronization signals 150. Each sequence corresponds to a burst of DL synchronization signals 150. In the example of FIG. 6, the BS 101 is configured to sequentially transmit a plurality of sequences 250 (in FIG. 6, three sequences 250 are illustrated, but are smaller or larger number of sequences 250 could be sequentially transmitted). In particular, the plurality of sequences 250 is transmitted according to a repetitive schedule. In the example of FIG. 6, the repetitive schedule defines a periodicity 652. By using the repetitive schedule, multiple synchronization occasions are implemented.

For example, the terminal 102 can be configured to determine, for each one of the sequences 250, the average of the DL synchronization signals included in the respective sequence 250. For example, the averaging of the DL synchronization signals 150 at the terminal 102 can take into account the repetitive schedule. For example, the repetitive schedule may be predefined. For example, it may be possible to acquire the timing and/or frequency of the BS 101 based on properties of the repetitive schedule such as the periodicity 652.

Figure 7:
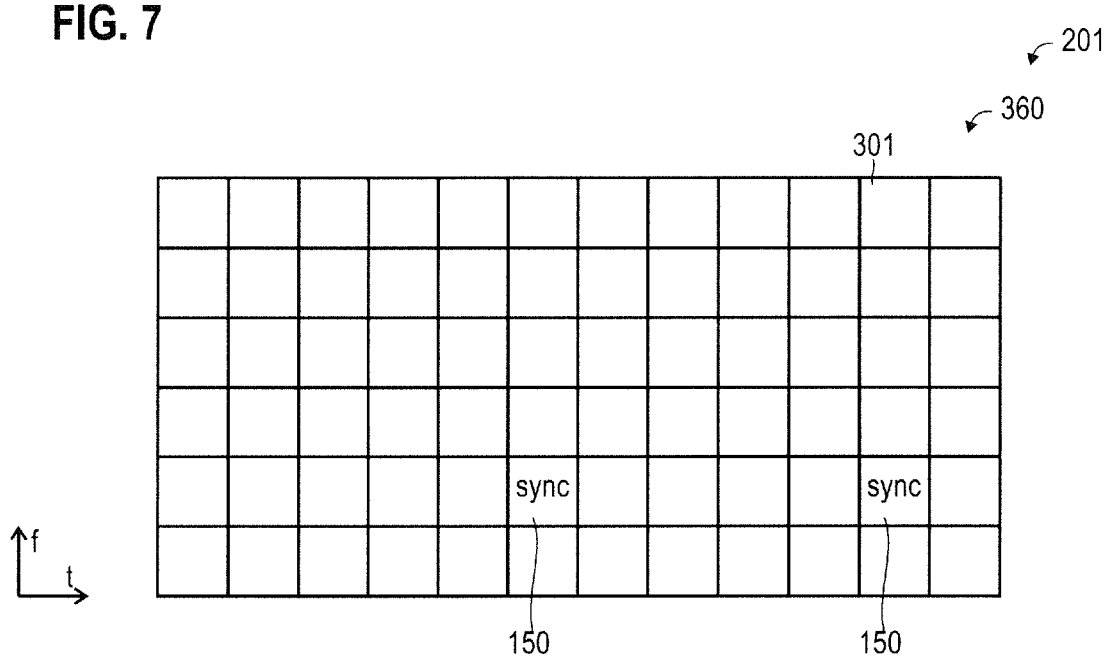
FIG. 7 schematically illustrates a resource mapping of a transmission frame of the wireless link according to various embodiments and further illustrates allocation of resources of the resource mapping to DL synchronization signals according to various embodiments.

FIG. 7 illustrates aspects with respect to the communication of the DL synchronization signals 150. In particular, FIG. 7 illustrates aspects with respect to allocation of resources 301 within a transmission frame 201 for communication of the DL synchronization signals 150. For example, the DL synchronization signals 150 illustrated in FIG. 7 may be part of the sequence 250 (in FIG. 7, the sequence 250 is not illustrated). In the example of FIG. 7, the DL synchronization signals 150 are aligned in time and frequency with the resource mapping 360.

In the example of FIG. 7, the transmission frame 201 includes two DL synchronization signals 150. In other examples, it is possible that the transmission frame 201 includes a smaller or larger number of DL synchronization signals 150. E.g., the transmission frame 201 may include DL synchronization signals 150 in each symbol, e.g., contiguously in each resource 301.

In the example of FIG. 7, the DL synchronization signals 150 are transmitted at one and the same frequency. In other examples, it is possible that the DL synchronization signals 150 are transmitted using different frequencies. For example, it is also possible that the DL synchronization signals 150 are transmitted on multiple frequencies.

From a comparison of FIGS. 2 and 7 it follows that in some examples it is possible that data symbols such as the DL data symbols 361 and the DL synchronization signals 150 are allocated to the same resources 301, sometimes referred to as resource sharing. This may be due to the possibility of averaging over the plurality of DL synchronization signals 150 of the sequence 250. Thereby, interference originating from using shared resources 301 can be reduced. At the same time, the overhead on the wireless link 111 due to communication of the DL synchronization signals 150 is reduced.

For example, it would be possible that the transmit power of the data symbols such as the DL data symbols 361 is larger than the transmit power of the DL synchronization signals 150. For example, the transmit power of the data symbols such as the DL data symbols 361 may be larger than the transmit power of the DL synchronization signals 150 at least by a factor of 10, optionally at least by a factor of 50, further optionally at least by a factor of 100. Thereby, interference caused by the DL synchronization signals 150 into communication of the data symbols such as the DL data symbols 361 may be reduced. At the same time, sufficient coverage for the DL synchronization signals 150 may be achieved by averaging over the plurality of DL synchronization signals 150 of the sequence 250.

Figure 8:
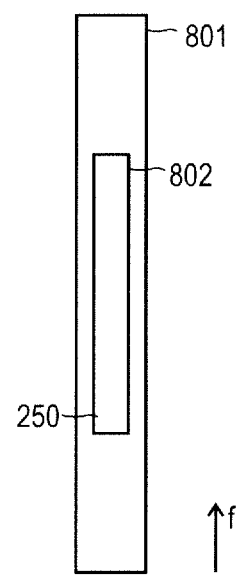
FIG. 8 schematically illustrates a bandwidth allocated to DL synchronization signals according to various embodiments.

FIG. 8 illustrates aspects with respect to the communication of DL synchronization signals 150. In particular, FIG. 8 illustrates aspects with respect to allocation of resources 301 having a certain bandwidth.

In the example of FIG. 8, the DL synchronization signals 150 occupy a certain bandwidth 802 which is smaller than the system bandwidth 801 of the link 111. In the example of FIG. 8, the DL synchronization signals 150 occupy the bandwidth 802 which is centered within the system bandwidth 801.

Figure 9:
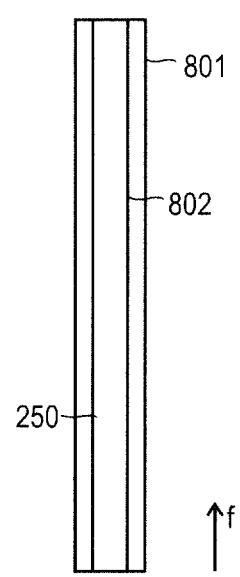
FIG. 9 schematically illustrates a bandwidth allocated to DL synchronization signals according to various embodiments.

FIG. 9 illustrates aspects with respect to the communication of DL synchronization signals 150. In particular, FIG. 9 illustrates aspects with respect to allocation of resources 301 having a certain bandwidth 502.

In the example of FIG. 9, the DL synchronization signals 150 occupy the bandwidth 802 which covers the entire system bandwidth 801. For example, such a scenario may be desirable within the framework of eMTC or NB-IoT where the system bandwidth 801 is comparably limited, e.g., if compared to 3GPP LTE links. E.g., the system bandwidth 801 may be less than 200 kHz.

Figure 10:
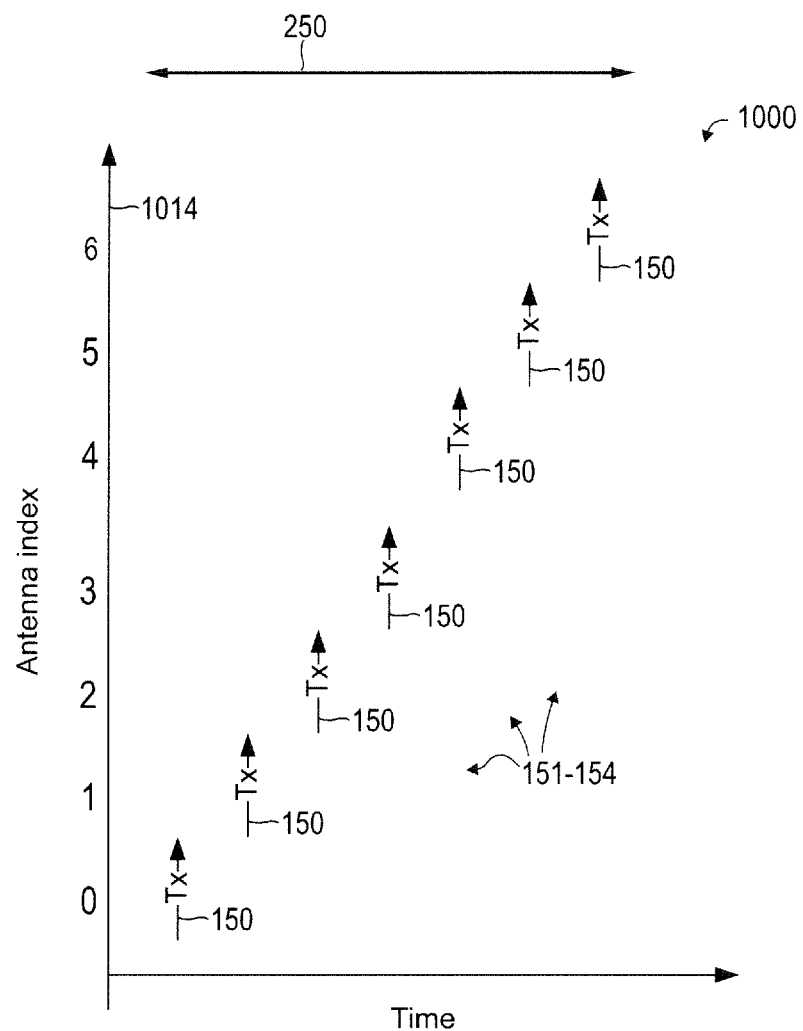
FIG. 10 schematically illustrates antenna weights for implementing different propagation channels for communicating DL synchronization signals according to various embodiments.

FIG. 10 illustrates aspects with respect to a pattern 1000 for implementing different propagation channels 151-154. In particular, FIG. 10 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

In the example of FIG. 10, the antenna array 1013 includes seven antennas (in FIG. 10, the vertical axis describes the antenna index of the different antennas 1014). According to the pattern 1000 of the example of FIG. 10, a DL synchronization signal 150 is first transmitted by the antenna 1014 having antenna index "0". Next, according to the pattern 1000, a DL synchronization signal 150 is transmitted by the antenna having antenna index "1". This continues until the antenna 1014 having the antenna index "6" transmits a DL synchronization signal 150. By such a deterministic pattern 1000—which may be predefined in some examples—, seven different propagation channels 151-154 are implemented by using different antenna weights of the plurality of antennas 1014 of the antenna array 1013.

In the example of FIG. 10, if any one of the antennas 1014 of the antenna array 1013 transmits a respective DL synchronization signal 150, the other antennas 1014 of the antenna array 1013 are muted. Such muting of the other antennas 1014 corresponds to setting the respective amplitude of the respective antenna weight to zero. Thus, the different propagation channels 151-154 are implemented using antenna weights having an amplitude larger than 0 only for a respective single one of the plurality of antennas 1014.

By toggling through the different antennas 1014 according to the pattern 1000 of the example of FIG. 10, static fading dips can be reduced. Furthermore, the coverage of the respective DL synchronization signals 150 is large, because it is defined by the respective single antenna 1014: omnidirectional transmission is possible.

For example, it would be possible to combine the deterministic pattern 1000 according to the example of FIG. 10 with a random contribution to obtain a partly random pattern.

Figure 11:
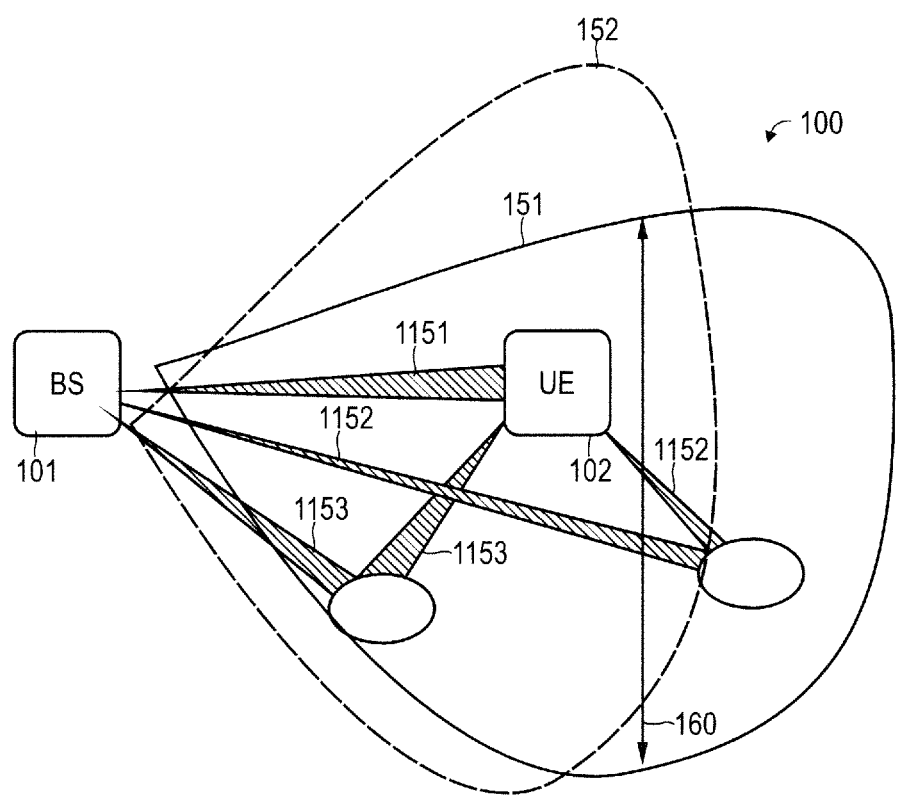
FIG. 11 schematically illustrates coverage of different propagation channels for communicating DL synchronization signals and DL data symbols according to various embodiments.

FIG. 11 illustrates aspects with respect to communicating DL synchronization signals 150 as well as DL data symbols 361. In particular, FIG. 11 illustrates aspects with respect to the coverage of the DL synchronization signals 150 and the DL data symbols 361.

In the example of FIG. 11, the spatial coverage of the propagation channels 151, 152 used for transmission of the DL synchronization signals 150 according to the example of FIG. 10—where only a single antenna 1014 has an antenna weight different from zero at a given moment in time—is illustrated (full line and dashed line in FIG. 11). As is apparent from FIG. 11, due to the use of single antennas, 1014 the spatial coverage of the propagation channels 151, 152 implements beams having a large beam width 160. Even though not illustrated in FIG. 11, omnidirectional coverage would be possible. In other words, at least some of the propagation channels 151-154 used for transmission of the DL synchronization signals 150 within the sequence 250 may have a beam width 160 of at least 120°, optionally of at least 240°, further optionally of 360°.

Implementation of propagation channels 151-154 having large beam widths 160 facilitates reduction of static fading dips. Additionally, because at the point of synchronization typically the position of the terminal 102 is not known, coverage can be enhanced.

FIG. 11 further illustrates the spatial coverage of the propagation channels 1151-1153 used for communication of the DL data symbols 361. The propagation channels 1151-1153 are configured according to the MaMi protocol and, thus, provide spatial diversity between transmissions to different terminals (in FIG. 11 only a single terminal 101 is illustrated). Thus, spatial multiplexing becomes possible.

Typically, the DL data symbols 361 are transmitted by the BS 101 using antenna weights where a plurality of the antennas 1014 have an amplitude larger than zero: this corresponds to a coherent, phased transmission of the DL data symbols 361 using the antenna array 1013. Based on such techniques, the directivity of the propagation channels 1151-1153 is increased. As illustrated in FIG. 11, the beam widths of the propagation channels 1151-1153 is smaller than the beam width 160 of the propagation channels 151, 152.

In the example of FIG. 11, spatial diversity and/or spatial multiplexing—including reflection from objects in the surrounding of the terminal 102—may be achieved by the coherent, phased transmission of the DL data symbols 361. On the other hand, enhanced coverage can be achieved for the isolated transmission of the DL synchronization signals 150 by single antennas 1014.

Figure 12:
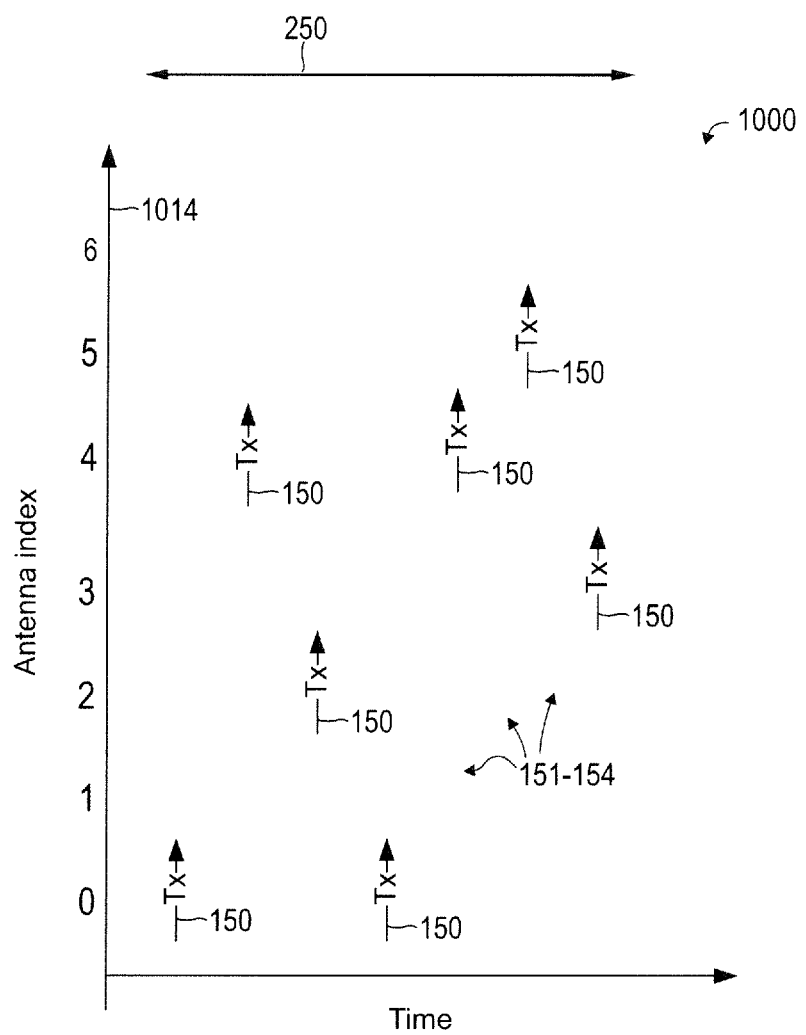
FIG. 12 schematically illustrates antenna weights for implementing different propagation channels for communicating DL synchronization signals according to various embodiments.

FIG. 12 illustrates aspects with respect to a pattern 1000 for implementing different propagation channels 151-154. In particular, FIG. 12 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

The example of FIG. 12 generally corresponds to the example of FIG. 10. However, in the example of FIG. 12, instead of a deterministic pattern, an at least partly random pattern 1000 is employed. For example, the at least partly random pattern 1000 can be pseudo-random, e.g., having comparably large repetition cycles or depending on certain state variables that cannot be predicted deterministically. For example, the at least partly random pattern 1000 can be fully random. For example, the at least partly random pattern 1000 can be fully random or may have at least some deterministic contributions. For example, the at least partly random pattern 1000 may have an underlying deterministic pattern with a superimposed random pattern 1000. For example, for some of the antennas 1014, the pattern may be deterministic, while for other antennas 1014 the pattern may be random. For example, the pattern may define time durations during which a random contribution is not present and may define further time durations during which a random contribution is present; e.g., the pattern 1000 may toggle between random and deterministic. For example, the phases of the antenna weights according to the at least partly random pattern may be determined randomly, while the amplitudes may be determined deterministically. For example, the amplitudes of the antenna weights according to the at least partly random pattern 1000 may be determined deterministically, while the phases may be determined randomly. As can be seen, the at least partly random pattern 1000 may have a deterministic contribution with respect to the antenna weight of at least one of the plurality of antennas 1014. By implementing the at least partly random pattern 1000, it is possible to efficiently address fading which typically also shows an at least partly random behavior.

Figure 13:
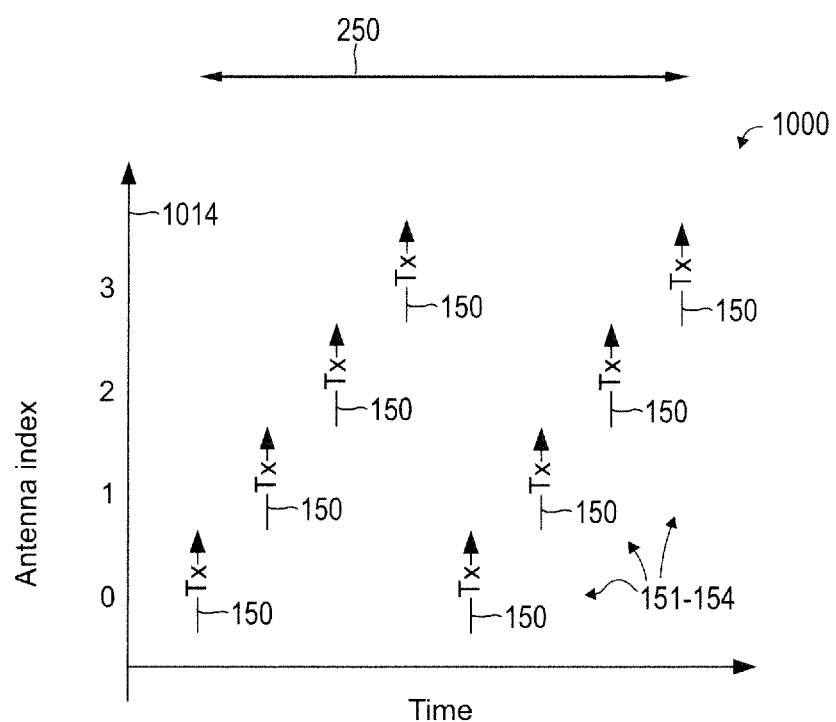
FIG. 13 schematically illustrates antenna weights for implementing different propagation channels for communicating DL synchronization signals according to various embodiments.

FIG. 13 illustrates aspects with respect to a pattern 1000 for implementing different propagation channels 151-154. In particular, FIG. 13 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

The example of FIG. 13 generally corresponds to the example of FIG. 10. However, in the example of FIG. 13, the deterministic pattern employs a cyclic shift. Thereby, additional spatial diversity can be provided by multiple repetitions of the DL synchronization signals 150 within the sequence 250.

For example, it would be possible to combine the deterministic pattern 1000 according to the example of FIG. 13 with a random contribution to obtain a partly random pattern.

Figure 14:
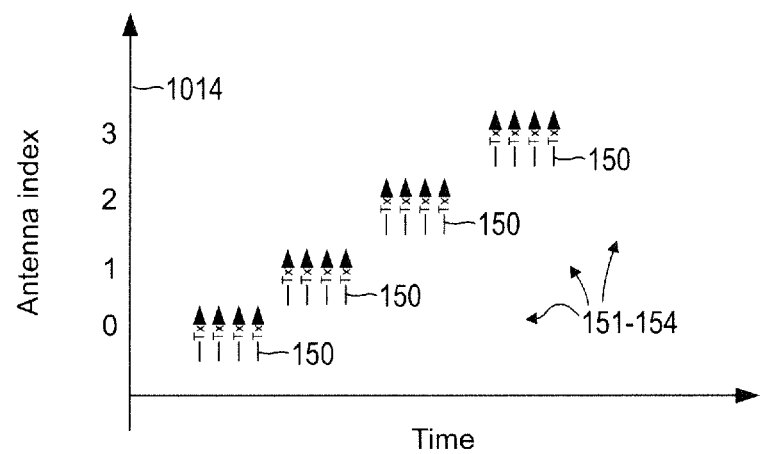
FIG. 14 schematically illustrates antenna weights for implementing different propagation channels for communicating DL synchronization signals according to various embodiments.

FIG. 14 illustrates aspects with respect to a pattern 1000 for implementing different propagation channels 151-154. In particular, FIG. 14 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

The example of FIG. 14 generally corresponds to the example of FIG. 10. However, in the example of FIG. 14, the deterministic pattern employs multiple repetitions per transmitting antenna 1014. This may allow for reduction of the fading, because the repetitions per antenna 1014 may be related to the SSCT 271 and/or LSCT 261.

For example, it would be possible to combine the deterministic pattern 1000 according to the example of FIG. 14 with a random contribution to obtain a partly random pattern.

Figure 15:
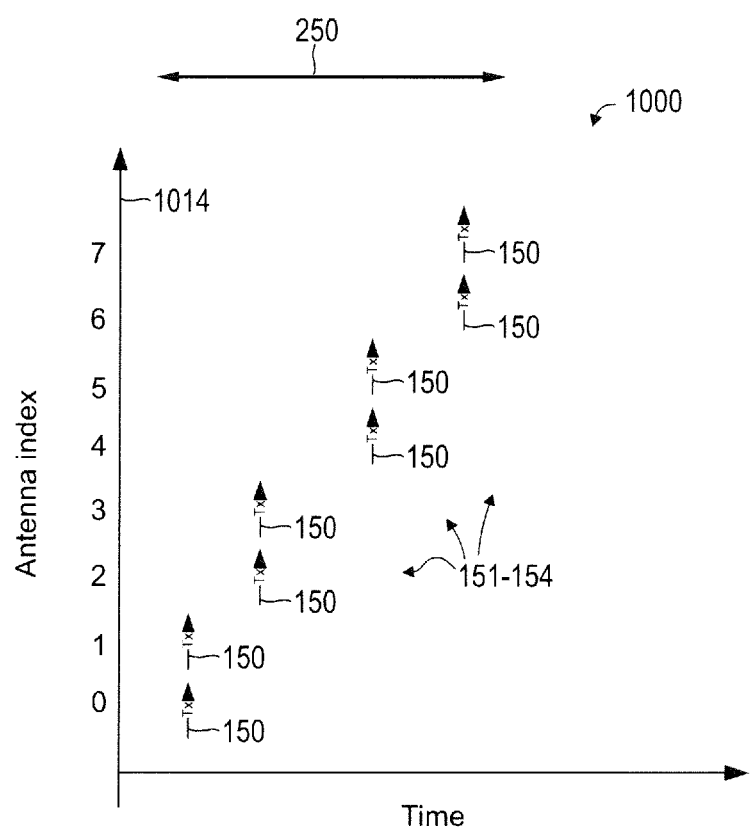
FIG. 15 schematically illustrates antenna weights for implementing different propagation channels for communicating DL synchronization signals according to various embodiments.

FIG. 15 illustrates aspects with respect to a pattern 1000 for implementing different propagation channels 151-154. In particular, FIG. 15 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

The example of FIG. 15 generally corresponds to the example of FIG. 10. However, in the example of FIG. 15, does not implement the propagation channels 151-154 using antenna weights which have an amplitude larger than zero only for a single one of the plurality of antennas 1014. In the example of FIG. 15, the BS 101 implements the propagation channels 151-154 using antenna weights which have an amplitude larger than zero for two of the plurality of antennas 1014 per propagation channel 151-154. In other examples, the BS 101 could implement the propagation channels 151-154 using antenna weights which have an amplitude larger than zero for more than two of the plurality of antennas 1014 per propagation channel 151-154.

In other words, the example of FIG. 15 corresponds to a coherent, phased transmission of the DL synchronization signals 150 using a plurality of antennas 1014 of the antenna array 1013. Because the DL synchronization signals are transmitted using more than a single antenna 1014, the transmit power per antenna 1014 can be lowered.

Typically, in a scenario is illustrated in FIG. 15, where a plurality of antennas 1014 contribute to the transmission of a DL synchronization signal 150, the beam width 160 of the respective propagation channel 151-154 is reduced. To avoid fading, it can be desirable to change the steering vector for different repetitions of the DL synchronization signals 150.

Also in examples using phase coherent transmission by multiple antennas 1014 as illustrated in FIG. 15, a random contribution can be employed. E.g., the steering vector may be determined at least partly randomized. E.g., the phase of the antenna weights may be determined at least partly randomly.

For example, it would be possible to combine the deterministic pattern 1000 according to the example of FIG. 15 with a random contribution to obtain a partly random pattern.

Figure 16:
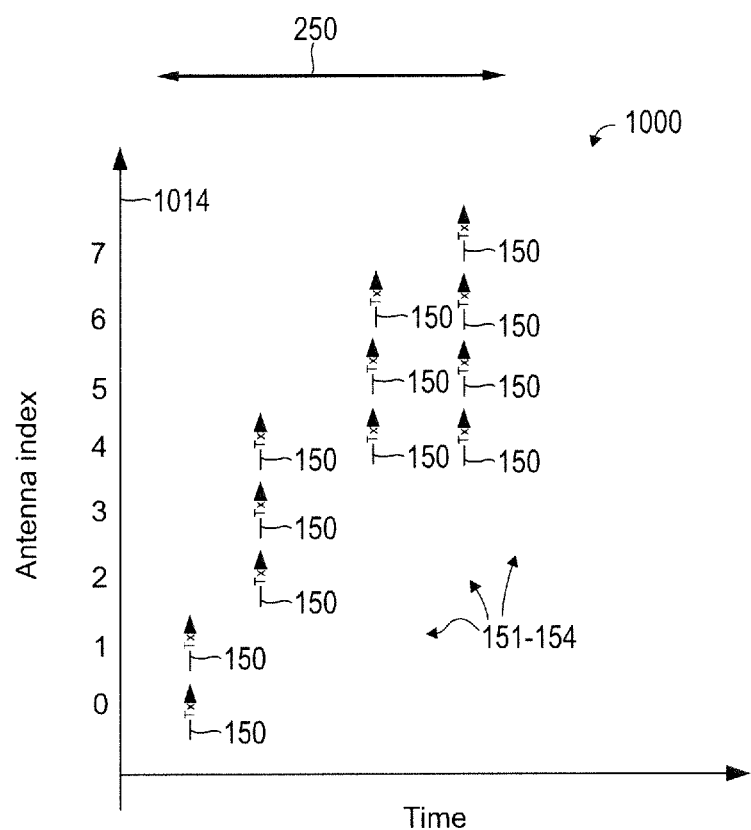
FIG. 16 schematically illustrates antenna weights for implementing different propagation channels for communicating DL synchronization signals according to various embodiments.

FIG. 16 illustrates aspects with respect to a pattern 1000 for implementing different propagation channels 151-154. In particular, FIG. 16 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

The example of FIG. 16 generally corresponds to the example of FIG. 15. However, in the example of FIG. 16, a the count of antennas 1014 having an amplitude of the antenna weights larger than zero is varied for the different propagation channels 151-154. By such a technique, it is possible to implement different beam widths for the different propagation channels 151-154. Typically, the beam width 160 can be dimensioned smaller for larger numbers of antennas 1014 participating in the transmission of the DL synchronization signals 150, i.e., having an amplitude of the antenna weight which is larger than zero. By using different beam widths for the different propagation channels 151-154, fading can be effectively reduced.

For example, it would be possible to combine the deterministic pattern 1000 according to the example of FIG. 16 with a random contribution to obtain a partly random pattern.

Figure 17:
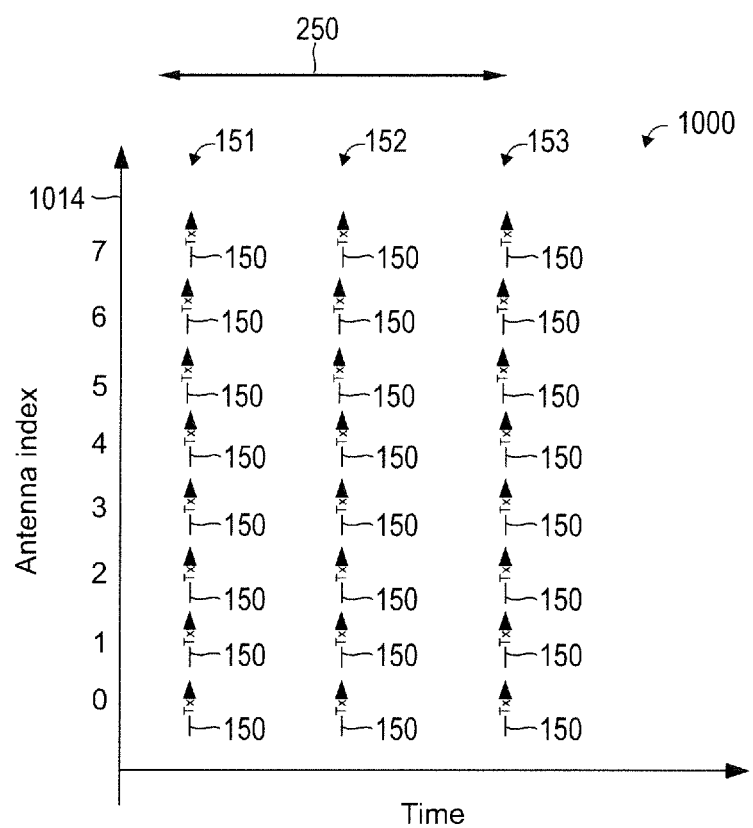
FIG. 17 schematically illustrates antenna weights for implementing different propagation channels for communicating DL synchronization signals according to various embodiments.

FIG. 17 illustrates aspects with respect to a pattern 1004 implementing different propagation channels 151-153. In particular, FIG. 17 illustrates aspects with respect to the antenna weights used by the BS 101 for implementing the different propagation channels 151-154. In detail, the amplitude of the antenna weights is illustrated: here, a particular antenna 1014 has an amplitude of the antenna weight larger than zero if an arrow indicates participation in the transmission of a DL synchronization signal 150 while a particular antenna 1014 has an amplitude of the antenna weight of zero if no arrow is present.

In FIG. 17, a scenario is illustrated in which all antennas 1014 of the antenna array 1013 participate in the transmission of the DL synchronization signals 150 for all propagation channels 151-153. Different propagation channels 151-153 are achieved by using different phases of the antenna weights. In other words, the phase correlation between the different antennas 1014 can be altered for different propagation channels 151-153 (in FIG. 17, the phase of the antenna weights is not illustrated).

For example, in the scenario as illustrated in FIG. 17 where a large number of antennas 1014 participate in the transmission of the DL synchronization signals 150, pencil beams having a particularly small beam widths 160 can be implemented. This is often referred to as beamforming.

For example, it would be possible to combine the deterministic pattern 1000 according to the example of FIG. 17 with a random contribution to obtain a partly random pattern.

Figure 18:
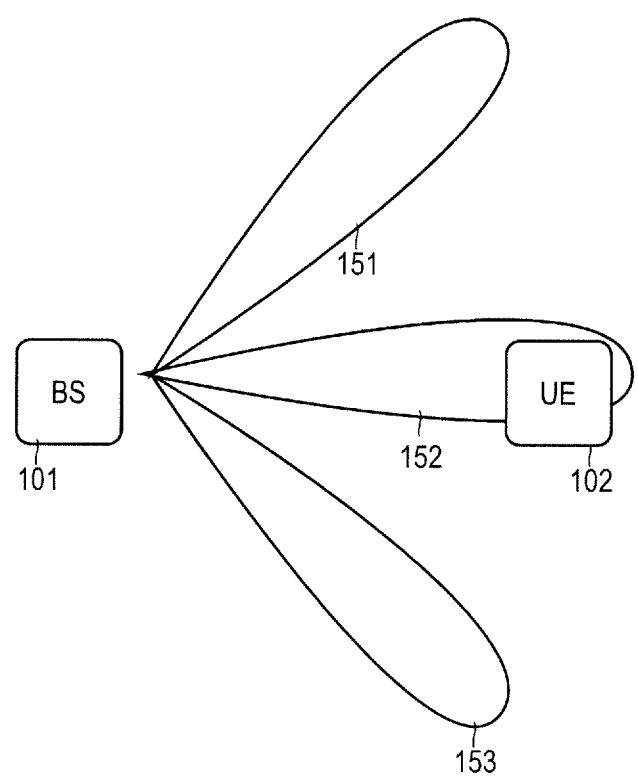
FIG. 18 schematically illustrates coverage of different propagation channels for communicating DL synchronization channels according to various embodiments.

FIG. 18 illustrates aspects with respect to communicating DL synchronization signals 150. In particular, FIG. 18 illustrates aspects with respect to the coverage of the DL synchronization signals 150.

In the example of FIG. 18, beamforming is employed to obtain pencil beams. In FIG. 18, beam sweeping of the plurality of propagation channels 151-153 is used. In the example of FIG. 18, omnidirectional coverage is achieved by changing the directional emission characteristics of the propagation channels 151-153 to cover a surrounding of the BS 101. For example, the scenario of FIG. 18 could be implemented by antenna weights according to the examples of FIG. 16 or 17.

With respect to the preceding FIGS., various example patterns 1000 for configuring the antenna weights to implement the different propagation channels 151-154 have been described. The various patterns 1000 serve illustrative purposes only and can be implemented differently in different examples. Furthermore, the various patterns 1000 can be combined with each other and further examples.

Figure 19:
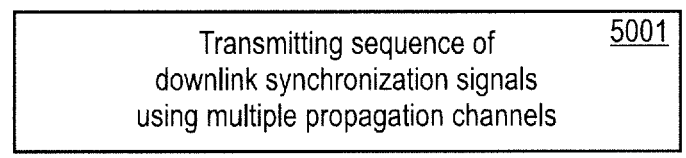
FIG. 19 is a flowchart of a method according to various embodiments.

FIG. 19 is a flowchart of a method according to various examples. In block 5001, a sequence of DL synchronization signals is transmitted using multiple propagation channels. Each propagation channel may be defined by certain antenna weights. For at least some of the antenna weights, the amplitude may only be non-zero for a single antenna. E.g., the antenna weights may correspond to toggling through different antennas implementing omnidirectional transmission of the DL synchronization signals.

In various examples, it is possible that the multiple propagation channels are selected according to an at least partly random pattern. The pattern may have or may not have deterministic contributions, e.g., with respect to the antenna weights of the various antennas.

Figure 20:
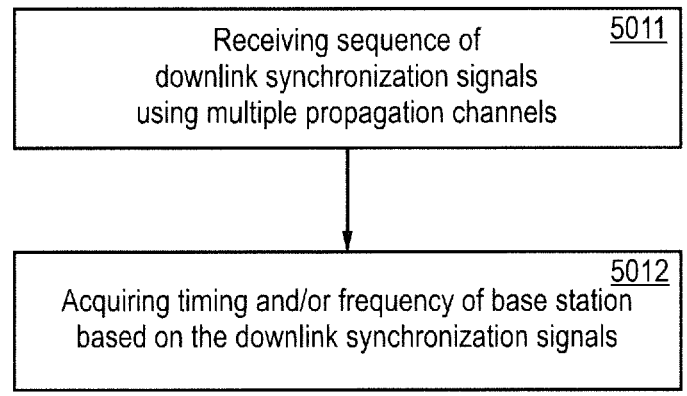
FIG. 20 is a flowchart of a method according to various embodiments.

FIG. 20 is a flowchart of a method according to various examples. In block 5011, the sequence of DL synchronization signals is received. E.g., in block 5011, the sequence of DL synchronization signals is transmitted in block 5001 (cf. FIG. 19) may be received.

Next, in block 5012, the timing and/or frequency of the BS is acquired based on the received DL synchronization signals of block 5011. Acquiring the timing and/or frequency of the BS may include acquiring a common time reference and/or frequency reference.

For example, in some implementations, the timing and/or frequency of the BS may be acquired based on an average of the received DL synchronization signals. For example, in some implementations, the DL synchronization signals may be decoded, e.g., if MIMO precoding is used. For example, in some implementations, the DL synchronization signal may be demodulated, e.g., if it is QPSK modulated. E.g., the DL synchronization signals may include additional information such as the identity of the BS, information on the operational mode of the wireless link such as frequency-domain duplex versus time-domain duplex, etc.

Summarizing, above techniques using multiple repetitions of transmissions of DL synchronization signals by utilizing multiple antennas of an antenna array. Thereby, transmit diversity can be provided to counteract fading. Reliable acquisition of a BS is possible.

In some examples, the BS use a single one of the—e.g., approximately 100—antennas at a given moment in time and for each iteration or few iterations changes the antenna. Thereby, the fading profile (signal distribution in the covered area) is changed, because it is related to the physical position of the antenna.

Alternative or additionally, in some further examples, a plurality of antennas—e.g., more than 50 of all antennas, optionally more than 80% of all antennas, or further optionally all antennas—are used at a given moment in time. Here, the relative phase and/or amplitude of the signal fed to the antennas (antenna weights) defines the propagation channel. The propagation channel may suffer from fading, because all energy can fall into a single beam or a limited set of beams and thus may be severely affected. By altering the antenna weights, either randomly or in a controlled, deterministic manner, the coverage area can be served with an "in average" signal having reduced static fading dips. In one example, a deterministically swept beam is employed. In a further example, random antenna weights are used for each iteration or few iterations: This typically results in multiple varying propagation channels, each with less power.

Alternatively or additionally, a subset of antennas can be used to shape a wide beam. The subset can be changed, e.g., randomly.

In some examples, the antennas of an antenna array all cover the same area, e.g., having omnidirectional transmission characteristics. Then, by feeding the signal solely to a single antenna, omnidirectional coverage can be achieved. Some examples described herein are based on the finding that the environment may have an impact on quality of communication of the DL propagation signals: reflections can destructively cancel the DL propagation signals (fading) at some locations. The fading profile will be different for the different antennas/propagation channels, because different antennas have different physical locations. By changing the antenna elements, "on average" fading is cancelled. Similar effects may be achieved by feeding multiple antennas simultaneously: here, the transmissions from the antennas will interact and we show some modified directional transmission characteristic. The directional transmission characteristic is, in general, not omnidirectional, but may include one or up to N simultaneous beams (N<=number of antennas). Such directional transmission characteristic also give raise to fading dips and thus can be altered over the course of a sequence of DL synchronization signals.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above various techniques have been described with respect to an at least partly random pattern according to which the plurality of propagation channels are selected, in other examples it is also possible to employ such techniques with respect to a deterministic pattern.

For example, it is possible to combine the various techniques described herein with respect to deterministic patterns according to which the plurality of propagation channels are selected with random patterns to obtain at least partly random patterns.

The invention claimed is:

1. A base station, comprising:
   an antenna array having a plurality of antennas;
   an interface coupled with the antenna array and configured to communicate on a wireless link; and
   at least one processor configured to control the interface to transmit a sequence of downlink synchronization signals to a device using a plurality of propagation channels, wherein the plurality of propagation channels is selected according to an at least partly random pattern,
wherein the at least one processor is further configured to control the interface to sequentially transmit a plurality of sequences of downlink synchronization signals according to a repetitive schedule, and
wherein, for each of the plurality of sequences, the downlink synchronization signals are averaged at the device based on the repetitive schedule.

2. The base station of claim 1,
wherein the at least one processor is further configured to control the interface to implement the propagation channels using different antenna weights of the plurality of antennas.

3. The base station of claim 2,
wherein the at least one processor is further configured to control the interface to implement at least one propagation channel of the plurality of propagation channels using respective antenna weights having an amplitude larger than zero only for a respective single one of the plurality of antennas.

4. The base station of claim 1,
wherein the at least partly random pattern is a partly random pattern and has a deterministic contribution with respect to an antenna weight of at least one of the plurality of antennas.

5. The base station of claim 1,
wherein the downlink synchronization signals are aligned with resources of a time-frequency resource mapping of the wireless link.

6. The base station of claim 1,
wherein the at least one processor is further configured to control the interface to transmit a first downlink synchronization signal of the sequence using a single first antenna of the plurality of antennas and to transmit a second downlink synchronization signal of the sequence using a single second antenna of the plurality of antennas.

7. The base station of claim 1,
wherein at least some of the plurality of propagation channels have a beam width of at least 120°.

8. The base station of claim 1,
wherein the plurality of propagation channels have at least partially different beam widths.

9. The base station of claim 1,
wherein the downlink synchronization signals of the sequence are all encoded based on the same sequence code.

10. The base station of claim 1,
wherein the at least one processor is further configured to allocate data symbols to time-frequency resources of the wireless link allocated to the downlink synchronization signals.

11. The base station of claim 10,
wherein the at least one processor is further configured to control the interface to transmit the sequence of downlink synchronization signals using a first transmit power,
wherein the at least one processor is further configured to control the interface to transmit downlink data symbols using a second transmit power,
wherein the second transmit power is larger than the first transmit power at least by a factor of 10.

12. The base station of claim 1,
wherein the sequence comprises downlink synchronization signals in each one of a plurality of adjacent transmission frames of the wireless link.

13. The base station of claim 1,
wherein the at least one processor is further configured to implement a Massive Multiple-Input Multiple-Output protocol for transmission on the wireless link.

14. A device, comprising:
at least one antenna;
an interface coupled with the antenna and configured to communicate on a wireless link; and
at least one processor configured to control the interface to receive a sequence of downlink synchronization signals from a base station using a plurality of propagation channels and to acquire a timing and/or frequency of the base station based on the downlink synchronization signals,
wherein the plurality of propagation channels is selected according to an at least partly random pattern,
wherein the at least one processor is further configured to control the interface to sequentially receive a plurality of sequences of downlink synchronization signals according to a repetitive schedule,
wherein the at least one processor is further configured to determine, for each one of the plurality of sequences, an average of the respective downlink synchronization signals based on the repetitive schedule.

15. The device of claim 14,
wherein the at least one processor is further configured to determine an average of the downlink synchronization signals of the sequence and to acquire a timing and/or frequency of the base station based on the average.

16. A method, comprising:
transmitting, on a wireless link, a sequence of downlink synchronization signals to a device using a plurality of propagation channels,
receiving, on a wireless link, a sequence of downlink synchronization signals from a base station using the plurality of propagation channels; and
acquiring a timing and/or frequency of the base station based on the downlink synchronization signals,
wherein the plurality of propagation channels is selected according to an at least partly random pattern,
wherein receiving, on the wireless link, the sequence of downlink synchronization signals, comprises receiving a plurality of sequences of downlink synchronization signals from the base station according to a repetitive schedule,
wherein the method further comprises:
determining, for each one of the plurality of sequences, an average of the respective downlink synchronization signals based on the repetitive schedule.

* * * * *